(12) United States Patent
Patel et al.

(10) Patent No.: US 6,909,080 B2
(45) Date of Patent: Jun. 21, 2005

(54) ARRANGEMENT FOR AND METHOD OF IMAGING TARGETS AT PLURAL FOCAL PLANES

(75) Inventors: Mehul Patel, Fort Salonga, NY (US); David Tsi Shi, Stony Brook, NY (US); Mark Krichever, Hauppague, NY (US); Paul Dvorkis, East Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 231 days.

(21) Appl. No.: 10/321,158

(22) Filed: Dec. 17, 2002

(65) Prior Publication Data

US 2004/0113042 A1 Jun. 17, 2004

(51) Int. Cl.$^7$ ............................................... H01L 27/00
(52) U.S. Cl. .................... 250/208.1; 359/625; 359/626; 235/454; 235/462.22; 235/462.24; 235/462.41; 348/340
(58) Field of Search ................................ 359/621, 622, 359/623, 625, 619, 620, 626, 721; 250/208.1; 396/111, 113, 268; 348/335, 340; 235/454, 462.22–462.24, 462.35, 462.41, 462.32

(56) References Cited

U.S. PATENT DOCUMENTS

| | | | | |
|---|---|---|---|---|
| 5,345,336 A | * | 9/1994 | Aoyama et al. | ............ 359/628 |
| 5,473,149 A | * | 12/1995 | Miwa et al. | ............ 235/462.41 |
| 5,627,366 A | * | 5/1997 | Katz | ............ 250/234 |
| 5,694,246 A | * | 12/1997 | Aoyama et al. | ............ 359/619 |
| 5,814,827 A | * | 9/1998 | Katz | ............ 250/556 |
| 5,822,125 A | * | 10/1998 | Meyers | ............ 359/621 |
| 6,024,283 A | * | 2/2000 | Campanelli et al. | ... 235/462.32 |
| 6,318,635 B1 | * | 11/2001 | Stoner | ............ 235/462.45 |
| 6,609,660 B1 | * | 8/2003 | Stoner | ............ 235/462.22 |

\* cited by examiner

*Primary Examiner*—David Porta
*Assistant Examiner*—Davienne Monbleau
(74) *Attorney, Agent, or Firm*—Kirschstein, et al.

(57) ABSTRACT

An imaging arrangement for, and method of, imaging a target at one of a plurality of focal planes, includes a two-dimensional sensor having an array of pixels for converting incident light into electrical signals to be processed into an image of the target, and an optical assembly including a stationary optical element transmissive to the incident light en route to the sensor. The element is fixed relative to the sensor and has a plurality of optical portions respectively arranged in a plurality of patterns relative to a plurality of groups of the pixels. The assembly is operative for focusing the respective groups of the pixels in the respective patterns at respective focal planes spaced apart from one another away from the sensor.

9 Claims, 2 Drawing Sheets

ARRANGEMENT FOR AND METHOD OF
IMAGING TARGETS AT PLURAL FOCAL
PLANES

BACKGROUND OF THE INVENTION

1. Field of the Invention

This invention generally relates to electro-optical readers for reading indicia such as bar code symbols and to digital cameras and, more particularly, to imaging arrangements for, and methods of, imaging targets at plural focal planes arranged along an axis away from a two-dimensional, solid-state sensor array.

2. Description of the Related Art

Both charge-coupled device (CCD) and complementary metal-oxide semiconductor (CMOS) image sensors are used in digital cameras for imaging a target. Each such two-dimensional, solid-state sensor has a multitude of cells or pixels for converting incident light into electrons. In a CCD sensor, an accumulated charge of each cell is transported across, and read out of, the array. In a CMOS sensor, several transistors at each pixel amplify and move the charge using traditional wires. CCD sensors have excellent light sensitivity and produce high quality images, whereas CMOS sensors have lower sensitivity, but are much less expensive in manufacture and have an extended battery life. The two-dimensional, solid-state sensor in a digital camera is used with an objective lens assembly, typically focused at infinity in order to capture an image of the target located away from the camera, typically more than two feet away.

Targets, such as optical codes, typically one- or two-dimensional bar code symbols, can also be electro-optically read by readers using two-dimensional, solid-state sensors, preferably in combination with an objective lens assembly which includes one or more focusing lenses and a light collection aperture through which light reflected from the targets is collected. Such readers have a single sharp focus or focal plane located relatively close to the readers (within a few inches of a window on the reader) and a limited depth of field in which a symbol is readable at the focal plane. In order to increase the depth of field of such readers, the aperture is kept relatively small. However, this limits the amount of the light collected, increases the integration time and renders a hand-held reader more susceptible to hand jitter. The versatility and working range of such readers are therefore compromised.

SUMMARY OF THE INVENTION

Objects of the Invention

Accordingly, it is a general object of the present invention to increase the working range of electro-optical readers using two-dimensional, solid-state sensors.

More particularly, it is an object of the present invention to provide such a reader with plural focal planes located at different distances away from the sensor.

Still another object of the present invention is to create multiple focal planes without moving an objective lens.

It is yet another object of the present invention to render hand-held readers less susceptible to hand jitter.

A still further object of the present invention is to provide a larger light collection aperture than heretofore used in order to collect more light, reduce the integration time, and to use a less sensitive, cheaper sensor such as a CMOS sensor.

A concomitant object of the present invention is to provide a single instrument capable of imaging targets in a far-field range, or in a near-field range, of distances relative to the instrument.

Still another object of the present invention is to decrease decode time by following an array of lines on the sensor similar to a slot scanner array of lines.

FEATURES OF THE INVENTION

In keeping with these objects and others which will become apparent hereinafter, one feature of this invention resides, briefly stated, in an imaging arrangement for, and a method of, imaging targets located at plural focal planes. A two-dimensional, planar, solid-state sensor, such as a CCD or CMOS sensor, has an array of cells or pixels for converting incident light into electrical signals that are processed to form images of the targets.

In accordance with this invention, an optical assembly includes a stationary optical element which is fixed relative to the sensor and which is transmissive to the incident light. The assembly optically modifies the incident light. The element has a first plurality of optical portions arranged in a first pattern relative to a first group of the pixels. The assembly is operative for focusing the first group of pixels in the first pattern at a first focal plane away from the sensor. The element also has a second plurality of optical portions arranged in a second pattern relative to a second group of the pixels. The assembly is operative for focusing the second group of pixels in the second pattern at a second focal plane away from the sensor. The first and second pluralities of optical portions, the first and second patterns, the first and second groups of pixels, and the first and second focal planes are different. Additional optical portions, patterns, and groups may be employed to produce additional focal planes arranged along an axis generally perpendicular to the plane of the sensor.

In the preferred embodiment, each plurality of optical portions consists of a light-refractive material, such as glass or plastic, which is applied in a molten state directly on the pixels and allowed to cure in situ thereon. The optical portions of the first plurality has a first uniform thickness and acts as a first refractive element. The optical portions of the second plurality has a second, different uniform thickness and acts as a second refractive element. One or more separate focusing lenses and a light collection aperture in front of the refractive elements and the sensor are employed. Light from the target passes through the aperture and the lenses and is refracted by one of the refractive elements depending on where the target is located along the optical axis.

The focal planes are spaced apart along the optical axis generally perpendicular to a plane of the sensor. By controlling the thickness of the optical portions, the index of refraction and, hence, the location of each focal plane is controlled because the pixels of each group will be focused at different focal planes. This multiple focus arrangement enables the target to be imaged over an extended working range along the optical axis. The aforementioned light collection aperture can be opened up to enable the sensor to receive more light, to reduce the integration time, to avoid hand jitter, and to enable the less sensitive, less expensive CMOS sensor to be used, especially in battery-operated instruments where long battery life is important.

In the case where the target is a symbol, at least one of the patterns is preferably an omnidirectional pattern comprised of a plurality of intersecting linear regions, at least one of the regions extending over a one-dimensional bar code symbol in use. By trying to decode along the predetermined pattern, one saves decode time, because there is no need to identify where the bar code symbol is and what is the bar code symbol orientation.

In another embodiment, at least one of the pluralities of optical portions has a variable thickness and acts as a focusing lens to focus light from the target onto the associated group of the pixels. This focusing lens is operative only, or in combination with, the objective lens assembly.

The target need not be a symbol, but could be any person, place or thing, in which case, the target is often positioned well away from the sensor. The optical assembly is therefore preferably focused at infinity in such cases.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
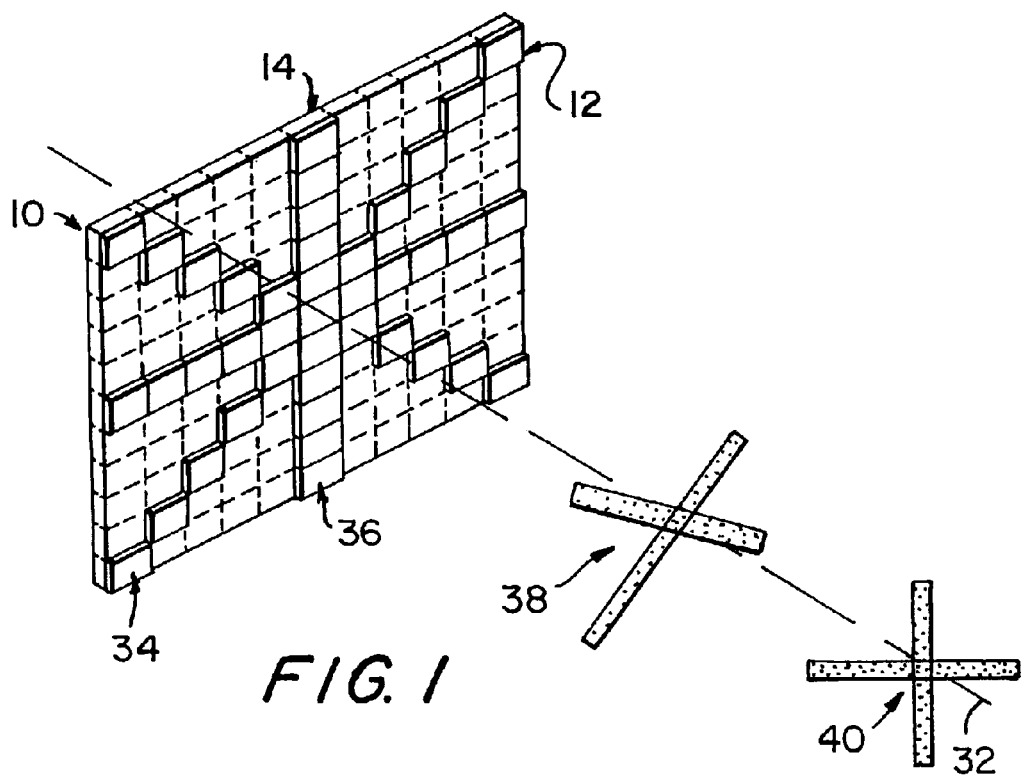
FIG. 1 is a perspective view of optical portions in accordance with this invention fixed to a sensor.

Referring now to FIG. 1, reference numeral 10 generally identifies a two-dimensional, generally planar, solid-state sensor, such as the CMOS or CCD sensor described above, operative in a digital camera for collecting light from a target such as a person, place or thing to capture an image of the target, and in an electro-optical reader for collecting light from a target such as a one- or two-dimensional bar code symbol to capture an image of the symbol and thereupon to convert the image into information related to the symbol. The sensor 10 is an array of mutually orthogonal horizontal rows 12 and vertical columns 14 of pixels or cells, each operative for converting incident light into electrical signals for subsequent image processing. Only several rows and columns have been shown to simplify the drawings, because it will be readily understood by those skilled in the art that such sensors may consist of hundreds of rows and columns, the exact number being dependent on the desired image resolution. The sensor 10 can be a black-and-white or a color sensor and, as described so far, is entirely conventional.

Figure 2:
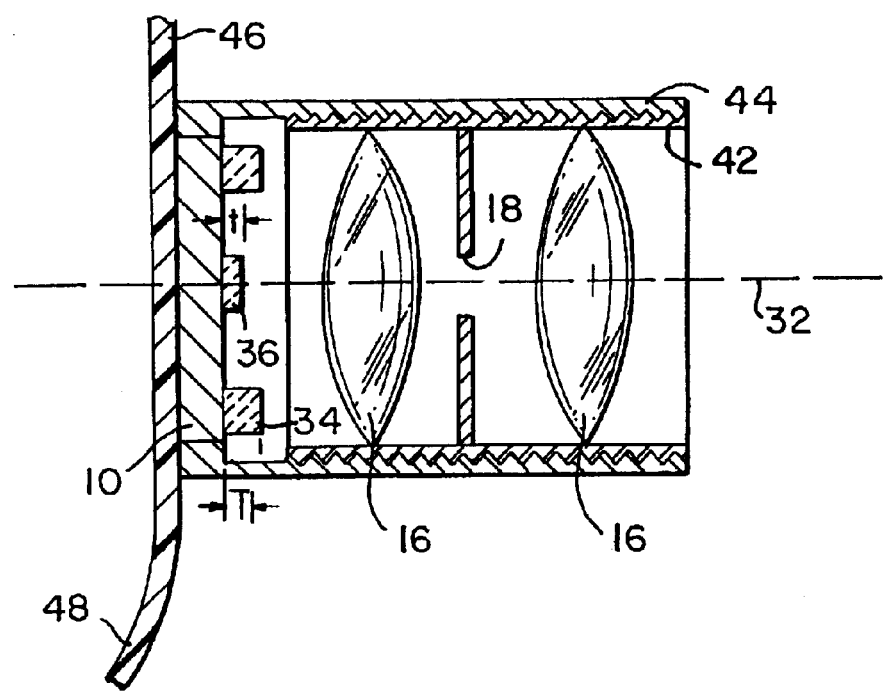
FIG. 2 is a part-sectional view of the sensor of FIG. 1 mounted within a chassis on a printed circuit board.

Also conventional, as shown in FIG. 2, an objective focusing assembly including one or more lenses 16 and a light collection aperture 18 is mounted in front of the sensor 10. Light from a target passes through the aperture 18 and is focused by the lenses 16 onto all the pixels of the sensor. Thus, the light is collected, and an image of the target is captured. The target is located within a working range of distances or depth of field on either side of a single focal plane located, in the case of a bar code reader, in a near-field range of a few inches in front of the reader and, in the case of a digital camera, in a far-field range of a few feet away from the camera.

Figure 4:
FIG. 4 is a sketch of a hand-held reader equipped with the invention of FIG. 2 for reading bar code symbols at a plurality of focal planes.

In accordance with this invention, a plurality of focal planes 20, 22, 24, 26, 28, and 30 (see FIG. 4) is formed at different distances along an optical axis 32 generally perpendicular to the plane of the sensor. A single type of target, for example, a bar code symbol, can be located in the depth of field of any one of the focal planes, thereby to provide an extended working range in which bar code symbols can be read. Alternatively, different types of targets can be located in the depths of field of different focal planes, thereby to enable one arrangement to image a first type of target, e.g., a symbol, in a near-field range, and to image a second type of target, e.g., a person, place or thing, in a far-field range.

The focal planes are formed by different optical portions arranged in different patterns relative to different groups of the pixels. As shown in FIG. 1, a first plurality of optical portions 34 is arranged in an X-shaped pattern relative to a first group of pixels extending along major diagonals of the array. This X-shaped pattern of optical portions 34 is preferably formed by applying a refractive material, such as glass or plastic, in a molten state on the first pixel group and allowing the applied material to cure in situ. This X-shaped pattern of optical portions 34 is preferably applied so that each portion thereof has the same thickness "T" (see FIG. 2) or height, on the order of 1 mm, above the sensor.

As also shown in FIG. 1, a second plurality of optical portions 36 is arranged in a cross-shaped pattern relative to a second group of pixels extending along vertical and horizontal centerlines of the array. This cross-shaped pattern of optical portions 36 is preferably formed by applying the same, or a different, refractive material, such as glass or plastic, as before, in a molten state on the second pixel group and allowing the applied material to cure in situ. This cross-shaped pattern of optical portions 36 is preferably applied so that each portion thereof has the same thickness "t" (see FIG. 2) or height above the sensor. The height of the cross-shaped pattern is different from the height of the X-shaped pattern so that the indices of refraction of the patterns is different and, as illustrated, t is less than T.

The first pixel group has an X-shaped field of view 38 (see FIG. 1) at focal plane 20. The second pixel group has a cross-shaped field of view 40 at focal plane 30. The different heights of the first and second optical portions control the location of each focal plane, as well as the distance between the focal planes. Hence, light from a target located in a depth of field at focal plane 20 is collected over a X-shaped field of view, whereas light from a target located in a depth of field at focal plane 30 is collected over a cross-shaped field of view.

Both of the described fields of view are comprised of linear sections. In the event that the target is a one-dimensional bar code symbol, the entire symbol can be read if one of these linear sections crosses all of the bars and spaces that comprise the symbol.

Each of the above described patterns is comprised of two linear sections. It is preferred that each pattern includes at least three linear sections, thereby to comprise an omnidirectional pattern. Of course, the sections could be curved as in a Lissajous pattern.

Additional optical portions can be applied to the remaining pixels to form still more focal planes, e.g., 22, 24, 26, 28, spaced apart along the optical axis 32, thereby providing an extended working range in which a target can be located. It is preferred that all the pixels be covered by optical portions.

The optical portions 34,36 are stationary and directly fixed to and on the sensor. The multiple focal planes are achieved without movement of any optical components. The first and second pluralities of optical portions act as first and second refractive elements. Rather than being cured in situ, the first and second refractive elements can be formed as discrete elements and mounted directly on the sensor.

Figure 3:
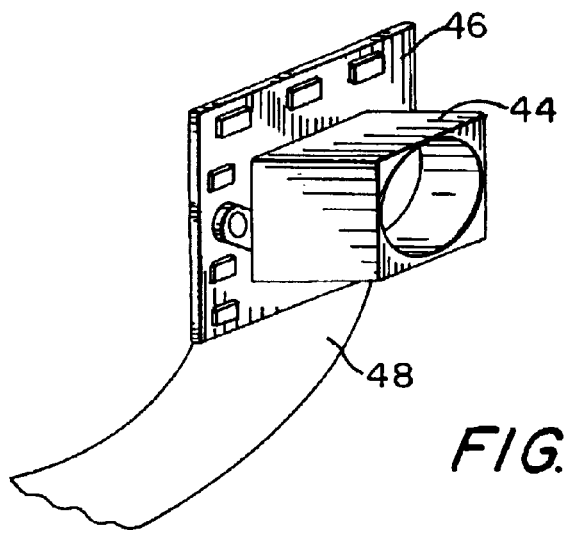
FIG. 3 is a perspective view of the components of FIG. 2.

It is also contemplated that each plurality of optical portions is applied in variable thicknesses on the sensor, each plurality thereby forming a focusing lens which either alone, or in combination, with the objective lens assembly focus the field of view at the respective focal plane. The objective lenses and the aperture stop are mounted in a common sleeve 42 which is threaded, glued or otherwise secured to a bore in a chassis 44. The chassis 44 also contains the sensor with the optical portions 34, 36 thereon. All of these components are mounted on a printed circuit board 46 having a flex connector 48 on which electrical signals are conducted. The board constitutes a common support or module and is shown in a perspective view in FIG. 3.

Figure 5:
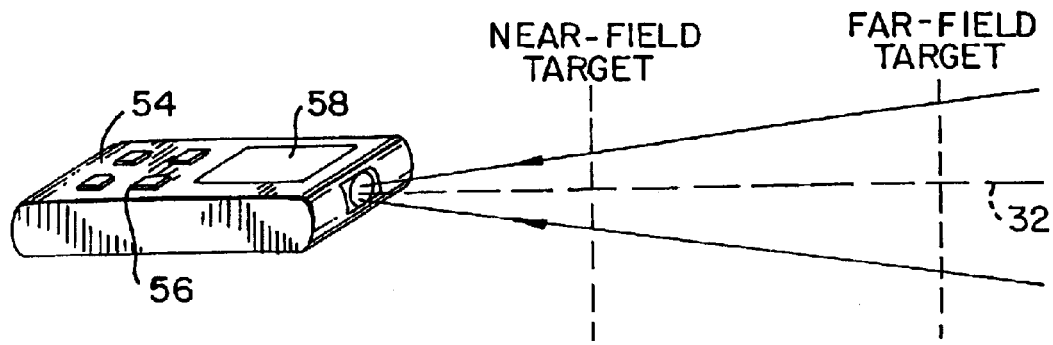
FIG. 5 is a data collection terminal equipped with the invention of FIG. 2 for reading bar code symbols and/or other targets at a plurality of focal planes.

The module can be mounted in housings of various sizes and shapes. For example, one type of housing is a hand-held instrument 50 shown in FIG. 4. Instrument 50 has a trigger 52 to initiate operation such as the reading of a bar code symbol. Another type of housing is a hand-held data collection terminal 54 shown in FIG. 5. Terminal 54 has a keypad 56 and a display 58. One of the keys is used to initiate operation such as the reading of a bar code symbol, especially in the near-field (five inches or less from the reader), or the taking of an image of a target, especially in the far-field, (two feet or more from the terminal) and, in the case of the latter, the terminal acts as a digital camera. It is sometimes desired for far-field imaging to not position any optical portions on the sensor, but to only position the optical portions on the sensor for the near-field imaging.

It will be understood that each of the elements described above, or two or more together, also may find a useful application in other types of constructions differing from the types described above.

While the invention has been illustrated and described as embodied in an arrangement for and method of imaging targets at plural focal planes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An imaging arrangement for imaging a target at one of a plurality of focal planes, comprising:

a) a two-dimensional sensor having an array of pixels for converting incident light into electrical signals to be processed into an image of the target; and b) a stationary optical assembly fixed to some, but not all, of the pixels, the assembly having a first plurality of optical portions arranged in a first pattern and fixed to a first group of the pixels, the first portions consisting of a light-refractive material having a first thickness and being operative for focusing the first group of the pixels in the first pattern at a first of the focal planes away from the sensor, the assembly also having a second plurality of optical portions arranged in a second pattern different from the first pattern and fixed to a second group of the pixels, the second portions consisting of a light-refractive material having a second thickness different from the first thickness and being operative for focusing the second group of the pixels in the second pattern at a second of the focal planes spaced apart from the first of the focal planes.

2. The arrangement of claim 1, wherein one of the patterns is an omni-directional pattern.

3. The arrangement of claim 2, where in the omni-directional pattern includes a plurality of intersecting pattern portions.

4. The arrangement of claim 1, wherein the focal planes are spaced along an optical axis perpendicular to a plane of the sensor.

5. The arrangement of claim 1, and further comprising a module on which the sensor and the assembly are jointly mounted.

6. The arrangement of claim 1, wherein the optical portions are integral with one another.

7. The arrangement of claim 1, wherein the thickness of each optical portion is constant.

8. The arrangement of claim 1, wherein the target is a bar code symbol.

9. The arrangement of claim 1, wherein each pattern is a pair of intersecting linear sections.

* * * * *